United States Patent
Goyal et al.

(10) Patent No.: US 11,042,458 B2
(45) Date of Patent: Jun. 22, 2021

(54) ROBOTIC OPTIMIZATION FOR ROBOTIC PROCESS AUTOMATION PLATFORMS

(71) Applicant: Accenture Global Solutions Limited, Dublin (IE)

(72) Inventors: Gaurav Goyal, New Delhi (IN); Katherine Wheeler Morgan-Baker, London (GB); Daniel Clifton-Hadley, London (GB); Ashwin Kumar Sridhar, London (GB)

(73) Assignee: Accenture Global Solutions Limited, Dublin (IE)

( * ) Notice: Subject to any disclaimer, the term of this patent is extended or adjusted under 35 U.S.C. 154(b) by 96 days.

(21) Appl. No.: 15/966,926

(22) Filed: Apr. 30, 2018

(65) Prior Publication Data

US 2019/0332508 A1    Oct. 31, 2019

(51) Int. Cl.
*G06F 11/30* (2006.01)
*G06F 11/34* (2006.01)

(52) U.S. Cl.
CPC ........ *G06F 11/302* (2013.01); *G06F 11/3414* (2013.01); *G06F 11/3419* (2013.01)

(58) Field of Classification Search
CPC ........ G06F 21/10; G06F 21/71; G06F 21/572; G06F 21/725; G06F 21/73; G06F 21/86; G06F 21/316; G06F 21/45; G06F 16/954; G06F 16/288; G06F 2216/15; G06F 17/2785; G06F 17/2775; G06F 17/278; G06F 17/28; G06F 17/241; G06F 17/218; G06F 2221/2135; G05B 13/0265; G05B 13/041
See application file for complete search history.

(56) References Cited

U.S. PATENT DOCUMENTS

| | | | | |
|---|---|---|---|---|
| 6,708,296 B1* | 3/2004 | Gover | ............... | G06F 11/3466 714/47.2 |
| 7,024,592 B1* | 4/2006 | Voas | ............... | G06F 11/3672 714/47.3 |
| 7,539,907 B1* | 5/2009 | Johnsen | ............... | G06F 11/008 714/26 |
| 7,702,966 B2* | 4/2010 | Chandwani | ........... | G06F 11/008 714/47.1 |
| 9,535,798 B1* | 1/2017 | Liguori | ............... | G06F 11/1438 |
| 9,817,967 B1 | 11/2017 | Sanjeev | | |
| 2009/0037884 A1* | 2/2009 | Benameur | ........... | G06F 11/3608 717/126 |
| 2012/0023041 A1* | 1/2012 | Kariv | .................. | G06F 11/3447 706/12 |

(Continued)

OTHER PUBLICATIONS

EP Search Report in European Application No. EP19169618, dated May 24, 2019, 8 pages.

*Primary Examiner* — Matthew M Kim
*Assistant Examiner* — Matthew N Putaraksa
(74) *Attorney, Agent, or Firm* — Fish & Richardson P.C.

(57) ABSTRACT

Methods, systems, and computer-readable media for identifying potential process failure in a robotic process automation (RPA) platform, actions can include providing a predictive model based on application records of processes executed in the RPA platform, receiving data representative of a process being executed by a bot within the RPA platform, determining a prediction indicating a likelihood of failure of the process, and selectively issuing an alert in response to the prediction.

18 Claims, 5 Drawing Sheets

(56) References Cited

U.S. PATENT DOCUMENTS

| | | |
|---|---|---|
| 2013/0318022 A1 | 11/2013 | Dayal |
| 2015/0112740 A1 | 4/2015 | Boris |
| 2015/0323948 A1* | 11/2015 | Jeong ..................... G05B 15/02 |
| | | 700/291 |
| 2015/0326454 A1* | 11/2015 | Geis ....................... H04L 43/04 |
| | | 709/226 |
| 2019/0095233 A1* | 3/2019 | Iikura ................. G06F 11/3419 |
| 2020/0159912 A1* | 5/2020 | Cervantez ............... G06F 21/53 |

* cited by examiner

ROBOTIC OPTIMIZATION FOR ROBOTIC PROCESS AUTOMATION PLATFORMS

BACKGROUND

Robotic process automation (RPA) can be described as the use of software to perform high-volume, repeatable tasks on computer systems. More particularly, RPA includes computer software robots (bots) that are each configured to capture and interpret existing applications to, for example, process a transaction, manipulate data, trigger responses, and/or communicate with other systems. RPA is distinct from automation processes in that RPA is aware of, and can adapt to changing circumstances, exceptions, and new situations. Once an RPA bot has been trained to capture and interpret the actions of specific processes in existing software applications, the bot performs its assigned tasks autonomously. In some examples, RPA can expedite back-office and middle-office tasks in a wide range of industries, which can include, without limitation, manufacturing, health care, telecom, insurance, finance, procurement, supply chain management (SCM), accounting, customer relationship management (CRM), and human resource management (HRM).

Multiple providers provide RPA services through respective RPA platforms. As the number of individual RPA platforms, and the number of bots on respective RPA platforms increase, monitoring, controlling, and managing RPA systems become complex, resource-intensive tasks.

SUMMARY

Implementations of the present disclosure are generally directed to a unified automation platform (UAP) for robotic process automation (RPA). More particularly, implementations of the present disclosure are directed to optimization within RPA platforms.

In some implementations, actions include providing a predictive model based on application records of processes executed in the RPA platform, receiving data representative of a process being executed by a bot within the RPA platform, determining a prediction indicating a likelihood of failure of the process, and selectively issuing an alert in response to the prediction. Other implementations of this aspect include corresponding systems, apparatus, and computer programs, configured to perform the actions of the methods, encoded on computer storage devices.

These and other implementations can each optionally include one or more of the following features: the prediction is provided as an initial prediction determined in response to completion of a threshold number of queues of the process; the prediction is provided as an updated prediction determined in response to completion of a queue of the process after a threshold number of queues have been completed; determining a prediction includes determining predictions of respective components of a queue of the process based on the predictive model, and providing the prediction based on the predictions of the respective components; the prediction including a value indicating one of success and failure of the process; the application records each include data representative of one or more dimensions including time-based variables, sequence-based variables, severity indices, patterns, and historical application exceptions; the processes include a sub-set of processes executed on the RPA platform, each process in the sub-set of process meeting criteria for inclusion in the sub-set of processes; and the criteria includes executed queues exceeding a threshold number of executed queues, execution time exceeding a threshold time period, and failure rate exceeding a threshold application failure rate.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Implementations of the present disclosure are generally directed to a unified automation platform (UAP) for robotic process automation (RPA). More particularly, implementations of the present disclosure are directed to optimization within RPA platforms. In accordance with implementations of the present disclosure, optimization can be achieved based on predictive analytics. Example predictive analytics include event sequencing analysis, and pre-event prediction.

With regard to event sequencing analysis, and as described in further detail herein, each process step in a process executed in a RPA platform is evaluated in real-time to determine where something deviates from an expected path in the sequence. In some implementations, if an actual path of the sequence deviates from the expected path of the sequence by a threshold degree, an alert is triggered. With regard to pre-event prediction, and as also described in further detail herein, a likelihood of process failure can be predicted in real-time, and an alert can be provided ahead of the predicted failure to facilitate resolution, and avoid the failure. In some implementations, prediction of a process failure can be based on output of the event sequencing analysis.

To provide further context for implementations of the present disclosure, RPA can be described as process automation technology that leverages software-implemented robots (also referred to herein as bots) to perform processes, or portions of processes. In some examples, bots include artificial intelligence (AI) features. Example AI features include, without limitation, intelligent scheduling, computer vision, language detection, entity recognition, and sentiment analysis. An RPA platform can be provided that includes multiple bots (e.g., tens, hundreds, thousands) executing on hardware systems. In some examples, a bot is deployed using a virtual machine (VM) that is executed on a hardware component (e.g., server). In some examples, multiple VMs, each running an instance of a bot, can be deployed on one or more servers.

In some examples, RPA can be implemented in organizations that have many different and complicated systems that need to interact together fluidly. For example, when an electronic form from a human resource system is lacking a form field, traditional automation software may flag the form as having an exception, and an employee would then handle the exception by, for example, looking up the missing information and entering it into the form. Once the form was completed, the employee might send it on to payroll so that the information could be entered into, for example, the organization's payroll system. With RPA, however, and continuing with the above example, a bot can be used, which is able to adapt, self-learn, and self-correct, handle exceptions, and interact with the payroll system without human assistance. Furthermore, technologies like presentation-layer automation software—a technology that mimics the steps of a rules-based, non-subjective process without compromising the existing information technology (IT) architecture—are able to consistently carry out prescribed functions, and scale-up or -down to meet demand.

RPA bots are provided in an RPA platform. Example RPA platforms include, without limitation, Automation Anywhere, Blue Prism, and UiPath. In some examples, an RPA platform provides a set of tools (e.g., bot development tools, bot management tools), libraries, and runtime environments for bots. In some examples, a bot can include one or more data objects, and logic that encodes a process (or portion of a process) that the bot is to perform. A bot interacts with one or more applications (i.e., computer-executable programs) to perform one or more jobs (e.g., processing a set of invoices). In some examples, each job includes one or more transactions (e.g., processing an invoice of the set of invoices), and each transaction can include one or more actions (e.g., entering invoice information into an application). For example, a data object of a bot can be connected to a user interface (UI) of an application (e.g., browser-based HTML interfaces, MS Windows interfaces, mainframe terminal interfaces, Java-based interfaces), and the data object executes one or more actions using the UI. For example, a data object can execute actions to log into an application, enter data, retrieve a result, and log off.

In some examples, a data object includes an application model, and one or more actions. For example, the application model is specific to an application that the bot is to interact with, and exposes elements of the UI of the application. The one or more actions include actions that the data object can perform with the application.

In some examples, an RPA platform can provide an application server that functions as a common control point for multiple bots, as well as a database. In some examples, the database functions as a shared repository for the RPA platform, storing code for each bot, work queues of the bots, audit logs, and the like. An RPA platform can also provide platform-specific control and monitoring tools for managing bots, creating dashboards, and the like.

Multiple RPA platforms can be provided across multiple enterprises. For example, a first RPA platform (e.g., Blue Prism) can be deployed for a first enterprise, and a second RPM platform (e.g., Automation Anywhere) can be deployed across a second enterprise. As noted above, however, each RPA platform includes platform-specific bots, monitoring, control, and databases. Consequently, each enterprise, and/or third-party operating on behalf of enterprises, is required to be knowledgeable about respective RPA platforms, and implement RPA platform-specific processes, and procedures to effectively, and efficiently manage and control bots on the respective RPA platforms.

In accordance with implementations of the present disclosure, a UAP is provided, which enables control, and monitoring, among other functionality, across multiple, disparate RPA platforms. In this manner, the UAP provides a central platform for management, control, analytics, and the like across multiple RPA platforms, and across multiple enterprises. For example, the UAP can be hosted, or operated by a third-party that performs RPA monitoring and control services for multiple enterprises across multiple, disparate RPA platforms. In some implementations, and as described in further detail herein, the UAP includes an RPA operations center (ROC), and an AP. In general, the UAP provides cross-platform monitoring and control at multiple levels. Example levels include a process level, a bot level, and an RPA platform level. The UAP provides, among other functionalities, reporting and analytics to measure and improve RPA services, and increase RPA levels, as well as control RPA platforms, and individual bots. Accordingly, the UAP of the present disclosure can operate across hundreds, or thousands of bots across multiple RPA platforms.

Figure 1:
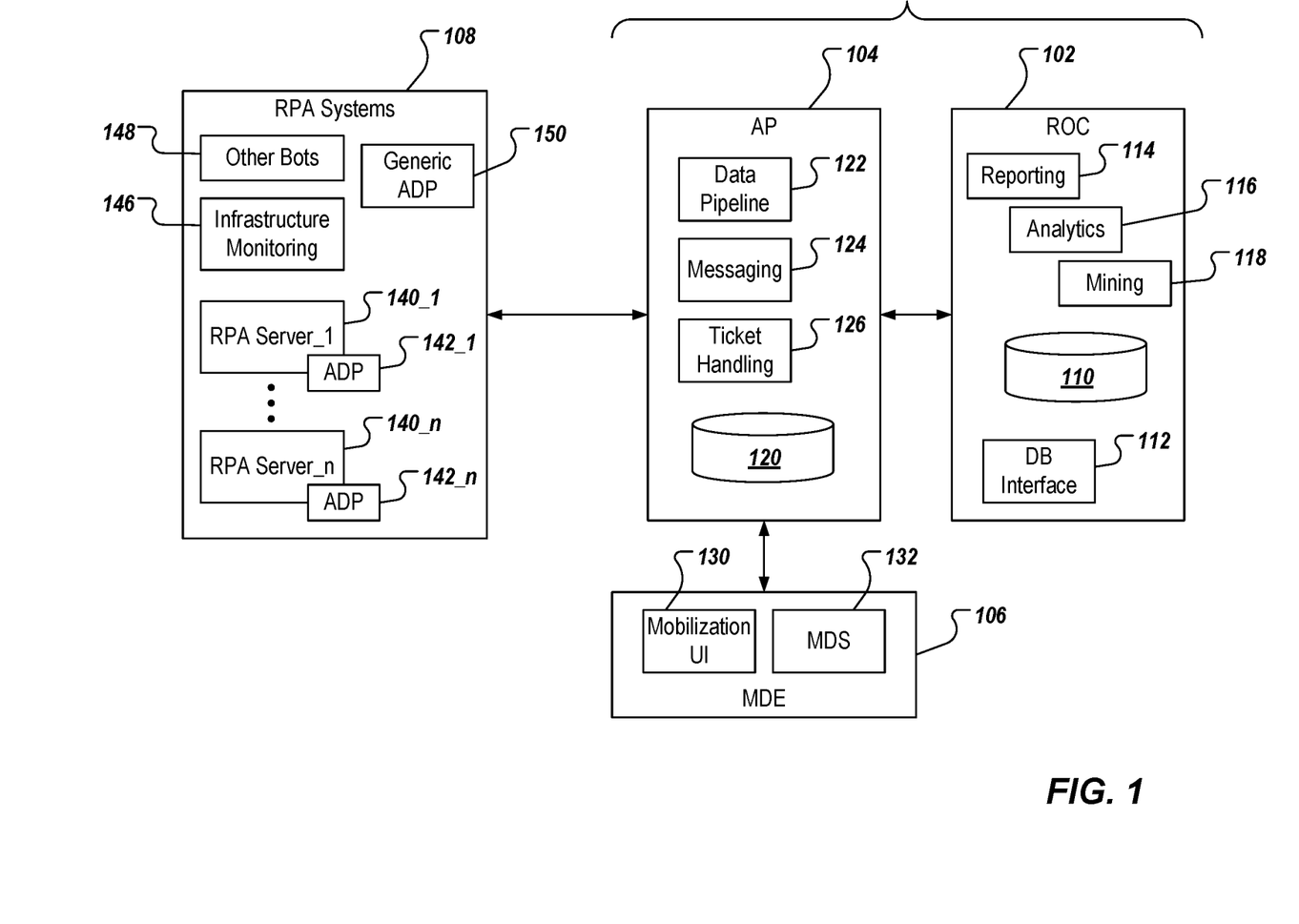
FIG. 1 depicts an example high-level architecture of an example unified automation platform (UAP) for robotic process automation (RPA).

FIG. 1 depicts an example UAP 100 in accordance with implementations of the present disclosure. The example UAP 100 includes an ROC 102, and an AP 104. In the depicted example, the UAP 100 also includes a master data entry (MDE) platform 106. In accordance with implementations of the present disclosure, the UAP 100 interfaces with one or more RPA systems 108 to provide bot monitoring and control, among other functionality, across multiple, disparate RPA platforms, and multiple, disparate enterprises. In some implementations, the UAP 100 communicates with the RPA systems over one or more networks. In some examples, a network can include a large computer network, such as a local area network (LAN), a wide area network (WAN), the Internet, a cellular network, a telephone network (e.g., PSTN), or any appropriate combination thereof connecting any number of communication devices, mobile computing devices, fixed computing devices, and back-end systems.

In some implementations, and as described in further detail herein, the AP 104 provides real-time monitoring, and bot control. As used herein, real-time may describe an operation that is performed without any intentional delay, taking into account the processing, and/or communication limitations of the computing system(s) performing the operation and the time needed to initiate, and/or perform the operation. Real-time may be used to describe operations that are automatically executed in response to a triggering event, for example, without requiring human input. In some examples, the AP 104 receives data from the RPA systems 108, and processes the data to provide, among other things, alerts and events. In some implementations, and as described in further detail herein, the AP 104 includes interface components (not shown) that provide logic for real-time monitoring and control of bots of the RPA systems 108 (e.g., logic to trigger alerts to support teams).

In some implementations, the ROC 102 provides ex-post reporting, analytics, and visualizations. In some examples, the ROC 102 receives data, alerts, events, and the like from the AP 104, and provides data reporting, and analytics across the multiple RPA platforms. For example, the ROC 102 provides UIs (e.g., dashboards) that enables users to view visualizations representing performance of RPA platforms, processes, individual bots, and/or groups of bots, across one or more enterprises, for which the RPA platforms are deployed. In some implementations, the UAP 100 enables users to take remedial measures, for example, in the event that performance is degraded. For example, the user can interact with the UAP 100 to adjust bot schedules, and/or spin-up, or spin-down bots to address workload fluctuations.

In the depicted example, the ROC 102 includes a database 110, a database (DB) interface 112, a reporting module 114, an analytics module 116, and a data mining module 118. In the depicted example, the AP 104 includes a database 120, a data pipeline module 122, messaging components 124, and a ticket handling module 126. In the depicted example, the MDE 106 includes a mobilization UI 130, and one or more master data systems (MDSs) 132.

In the examples of FIG. 1, the RPA systems 108 represents multiple RPA platforms, and/or other bot frameworks that are to be monitored, and/or controlled by the UAP 100. In the depicted examples, the RPA systems 108 includes multiple RPA servers 140_1, 140_n, each RPA server corresponding to a respective RPA platform (e.g., RPA server 140_1 is a Blue Prism RPA server; RPA server 140_n is an Automation Anywhere server). Each RPA server 140_1, 140_n is associated with a respective adapter (ADP) 142_1, 142_n. The RPA systems 108 further include infrastructure monitoring components 146, one or more other bots 148, and a generic ADP 150.

In accordance with implementations of the present disclosure, the AP 104 communicates with the respective RPA servers 140_1, 140_n through the data pipeline module 122. More particularly, and as described in further detail herein, the data pipeline module 122 ingests data from the respective RPA servers 140_1, 140_n through the respective adapters 142_1, 142_n. In some implementations, each adapter 142_1, 142_n is specific to a respective RPA platform, but is provided using a design pattern, and standardized module across adapters 142_1, 142_n. The adapters 142_1, 142_n enable communication between the UAP 100, and the respective RPA platforms, manage retrieval of data (e.g., status information) from respective RPA databases, and enable discovery, and control of bots in the respective RPA platforms. Each adapter 142_1, 142_n pulls data from the respective RPA platforms 140_1, 140_n.

In some implementations, the RPA systems 108 include one or more application program interfaces (APIs) that support communication with the UAP 100. In some examples, a push-listener API (not shown) is provided, and enables listening for incoming data that is pushed from one or more bots. In some examples, the push-listener API receives data from bots that are registered with the UAP 100 through the MDE 106. Although the push-listener API may receive data from non-registered bots, an error message is triggered. In effect, the push-listener API is a corollary to an adapter (e.g., the adapters 142_1, 142_n) for any automation tools, and/or bots that are not tied to a particular RPA platform (e.g., do not have a central automation application database), or where retrieval of monitoring data from such a central database is not possible. Accordingly, the monitoring data is pushed from individual automations to the push-listener API, as opposed to being pulled (as is the case with the adapters 142_1, 142_n).

In some implementations, the generic adapter 150 enables controlling (e.g., starting, stopping) of bots in RPA platforms, for which no platform-specific adapter (e.g., the adapters 142_1, 142_n) exists. In general, such bots can be controlled through a command line interface (CLI). The generic adapter 150 calls generic programs, and waits for return code. Parties providing such bots implement batch, and executable programs that are to be called by the generic adapter 150, and provide configuration files, and addresses (e.g., uniform resource locators (URLs)) to the batch, and executable programs.

In some implementations, an infrastructure API (not shown) is provided. The infrastructure API can include a web service interface for communicating infrastructure monitoring data. In some examples, the infrastructure API specifies generic data inputs, which infrastructures provide, and/or tools can provide. In some implementations, an infrastructure adapter (not shown) is provided, and can include a set of scripts (e.g., Powershell scripts) that communicate with the infrastructure API to monitor infrastructure, for which no other monitoring tool is available. In this manner, the infrastructure adapter provides a generic infrastructure monitoring solution.

In some implementations, the MDE 106 enables registration of bots that are not auto-discovered through adapters (e.g., the adapters 142_1, 142_n), or which are not registered directly to the UAP 100 (e.g., by an agent of a provider of the UAP 100). In some examples, the mobilization UI 130 is a web portal, through which a bot owner/operator can register a bot with the UAP 100. Such owner/operators can include, for example, any person or entity wanting to leverage the functionality provided by the UAP 100. In some implementations, the mobilization UI 130 validates data that is received against so-called golden source systems, and ensures completeness of master data of respective bots. In some examples, the mobilization UI 130 automates onboarding of non-discoverable bots, ensures data quality, and avoids non-matching data issues. In some examples, the MDS 132 represents any other third-party components (e.g., applications, data stores, services that are not part of the UAP 100), which are used to validate master data as part of bot onboarding to the UAP 100.

With particular reference to the AP 104, the database 120 is provided as a central database for storing data records received from the RPA systems 108. In some examples, the database 120 is provided as an online transaction processing (OLTP) database provided on a SQL server. In some implementations, the data pipeline 122 can include a central messaging system that is used to communicate data between components of the UAP 100. In some examples, the data pipeline 122 can be provided as a messaging system for communicating voluminous data. In some examples, the data pipeline 122 is provided using Kafka, which is provided by the Apache Software Foundation. Kafka can be described as a distributed streaming platform that enables messaging (e.g., queuing, publish-subscribe) for streaming data records, as well as real-time processing of the data records. In some examples, the data pipeline 122 is provided as a cluster (Kafka cluster) on one or more servers, and stores streams of data records, each data record. A data record can include a key, a value, and a timestamp. In some examples, the data pipeline 122 receives data records from producers. Example producers can include RPA platforms, and bots. In short, the producers produce data records, which are received by the data pipeline 122.

In some implementations, the messaging components 124 represent one or more channels, through which messages can be provided (e.g., to users, to computing systems). Example channels include, without limitation, electronic messages (e-mail), instant messages, text messages, and SMS messages. For example, logic executed by the AP 104 can trigger an alert (e.g., bot failure), and a message can be sent over one or more of the messaging components 124 in response thereto (e.g., to a user responsible for monitoring bot activity).

In some implementations, the ticket handling module 126 provides a ticket generation and management system that is used to track resolution of incidents. In some examples, the ticket handling module 126 is provided by a third-party service provider, and is external to the UAP 100. An example ticketing system can be provided by Service Now. In such examples, the AP 104 communicates with the external ticketing system through a respective API.

With regard to the ROC 102, data is ingested into the database 110 through the database interface 112. In some implementations, the database 110 is provided as an online analytical processing (OLAP) database. In general, the database 110 functions as a central database for analytics, reporting, and visualizations. In some examples, the database interface 112 is provided as a database link with OLTP, and/or extraction, transforming, and loading (ETL) (e.g., using SQL Server Integration Services (SSIS)). In some examples, the database interface 112 receives data from the database 120 of the AP 104, transforms data (e.g., from an OLTP data schema to an OLAP data schema), and performs data aggregation (e.g., for reporting). In some examples, the database interface 112 receives data from one or more other systems, such as the ticket generation and management system introduced above.

In some implementations, the reporting module 114 queries data from the database 110, and provides reports (e.g., textual, graphical). In some examples, the reporting module 114 provides reports through one or more dashboards, and/or transmits reports to external computing devices (e.g., emails reports to users). In some implementations, the ROC 102 includes a reporting API (not shown). In some examples, the reporting API exposes a web service that enables data sets to be accessed (e.g., for consumption by client reporting systems, data mining systems, AI systems, bespoke reporting systems, analytics systems).

In some implementations, the analytics module 116 provides reporting and dashboard visualizations for RPA support teams (e.g., agents of the UAP responsible for supporting RPA execution). In some examples, the analytics module provides access to standardized reports and dashboards that provide actionable information to improve RPA execution, and provide service status, and bot health information. In some implementations, the data mining module 118 provides more advanced dashboards and data visualizations, and can leverage third-party services. An example third-party service can include Tableau provided by Tableau Software. In some examples, the ROC 102 includes one or more other data mining technologies.

As introduced above, implementations of the present disclosure are directed to resource-efficient record processing in UAPs for RPA. In particular, implementations of the present disclosure provide resource-efficient record processing of data records ingested by an AP (e.g., the AP 104 of FIG. 1) from RPA systems (e.g., RPA systems 108 of FIG. 1).

Figure 2:
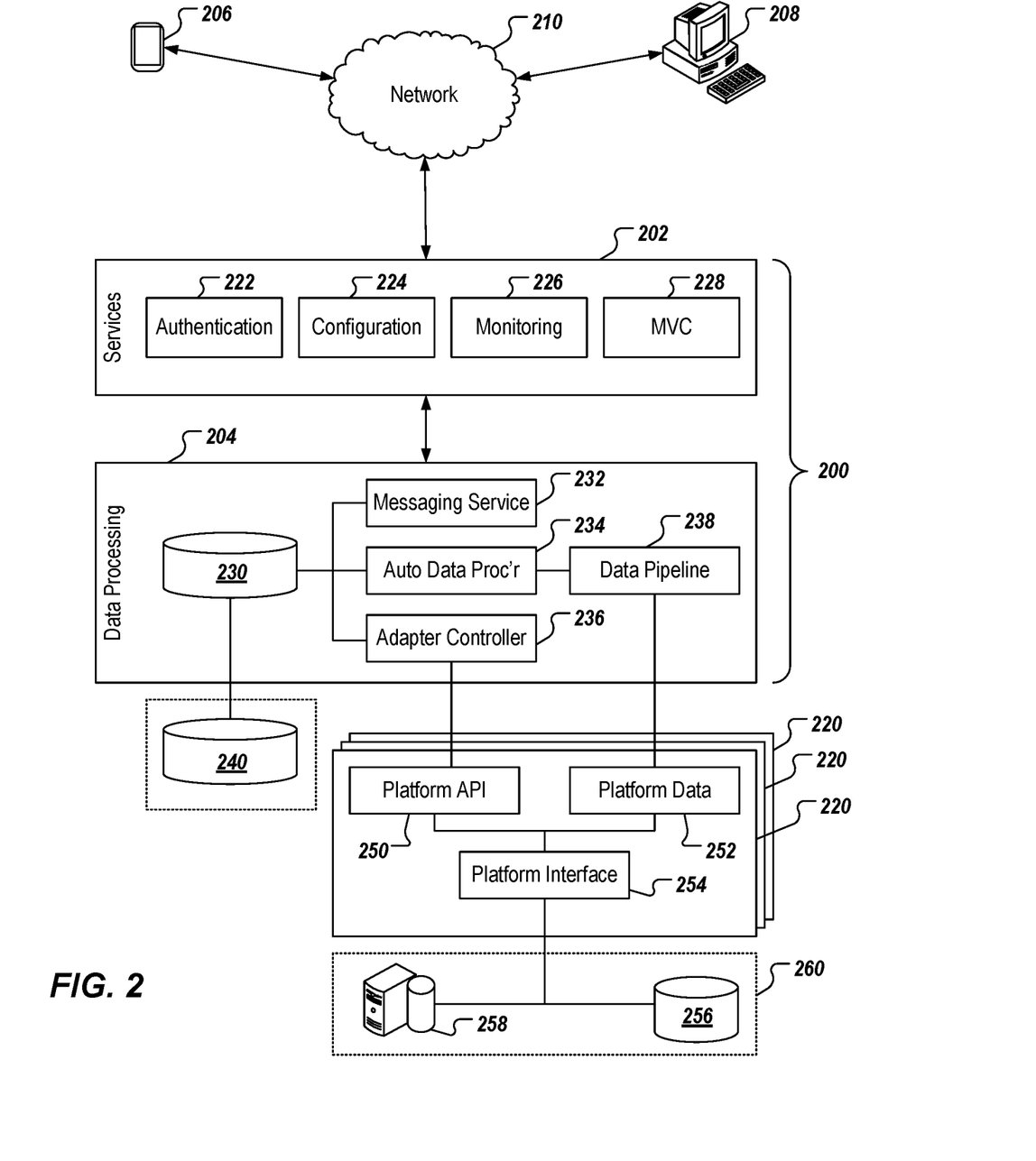
FIG. 2 depicts an example high-level architecture of an example autonomic platform (AP) of the UAP of FIG. 1.

FIG. 2 depicts an example high-level architecture of an example AP 200 of a UAP. For example, the AP 200 of FIG. 2 can be an example implementation of the AP 104 of the UAP 100 of FIG. 1. In the depicted example, the AP 200 includes a services layer 202, and a data processing layer 204. In some examples, one or more computing devices 206, 208 can communicate with the AP 200 over a network 210. One or more platform adapters 220 are provided, through which the AP 200 communicates with respective RPA platforms (e.g., Blue Prism, Automation Anywhere, UiPath). In some examples, each adapter 220 is authenticated to its respective RPA platform. For example, an adapter 220 includes an authentication token, which is generated during an installation and authentication process of the adapter 220 on the respective RPA platform.

In general, the AP 200 provides detailed status information regarding each process, and/or resource of respective RPA platforms. Example status information includes, without limitation: how many resources are running a process and will be required to complete the assigned tasks (e.g., within a SLA target); how many cases are pending to start, loaded new, and carried over from a previous time period (e.g., day); and expected completion time, average case time, and oldest case date. In some examples, a case is a segment of work to be completed by a process. For example, a case can include processing a series of invoices for payment, a task within the case can include processing a single invoice. The AP 200 also enables control of resources, for example: start and stop resources; restart the automation service the resource is running on, reboot the resource; a fail-safe prompt to reduce the chance of human error; live information about the resource (e.g., status, last case time, and log history); list available resources against all or selected processes with group selection; and providing a calendar for viewing history of processing tasks and logs.

In further detail, the services layer 202 includes a plurality of services, through which users can interact with the AP 200. In some examples, each service is provided as a web service. Example services include, without limitation, an authentication service 222, a configuration service 224, a monitoring service 226, and a control service 228.

In some examples, the authentication service 222 authenticates users for access to the AP 200. In some examples, authentication is at least partially conducted through the network 210 (e.g., the computing device 206, 208 connecting through a virtual private network (VPN)). In some examples, users are explicitly added to the AP through a control panel of the authentication service 222. All user sessions and operations are logged in a database of the AP 200, described herein. In one example, the authentication service 222 expects valid credentials (e.g., username, password), and returns an access token that is used in subsequent calls (e.g., when authenticating with a REST API, the AP 200 uses a standard OAuth2 Bearer workflow). In some examples, the authentication service 222 is also responsible for answering queries about user permissions to system resources, as well as allowing administrators to modify the access levels of other users.

In some examples, the configuration service 224 enables configuration of the AP 200. Example configurations can include, without limitation, creating/managing user profiles, setting up communication with RPA platforms, defining polling rates (e.g., frequency of polling RPA platforms for data), and the like. In some examples, the monitoring service 226 enables configuration of monitoring activities, and visualizations to be displayed. For example, the monitoring service 226 can be used to identify processes, bots, groups of bots, and/or RPA platforms that are to be monitored, as well as types of visualizations to be displayed for each. In some examples, the configuration service 224 enables querying, adding, and/or modifying domain-specific configurations in the AP 200. Example domain-specific configurations include, without limitation, client information, process information, and resource assignments.

In some implementations, the control service 228 accepts command requests for processes and resources, and stores the requests for background execution. In some examples, the control service 228 is provided as a model-view-controller (MVC) service.

In the depicted example, the data processing layer 204 includes a database 230, a messaging service 232, an automation data processor 234, an adapter controller 236, and a data pipeline 238. In some examples, the database 230, the messaging service 232, and the data pipeline 238 respectively correspond to the database 120, the messaging components 124, and the data pipeline 122 of FIG. 1. In some examples, the automation data processor 234 processes data about the state of the RPA platforms 260, and ensures that the database 230 reflects information correctly. The automation data processor 234 also calculates red-amber-green (RAG) statuses of the processes and resources that are monitored.

In some implementations, multiple automation data processors 234 are provided, and process data records having respective record types. Example record types are described in further detail herein. For example, a first automation data processor 234 is provided, which processes data records of a first type, and a second automation data processor is provided, which processes data records of a second type. In some examples, and as also described in further detail herein, the data pipeline 238 receives messages with data records from the adapters 220. The data pipeline 238 places the messages in respective processor queues. For example, messages having data records of the first type are placed in a first processor queue, and messages having data records of the second type are placed in a second processor queue. The automation data processor 234 retrieves messages from its respective queues, and processes the data records as described herein (e.g., determining RAG status, inserting into the database 230).

In some implementations, the data processing layer 204 periodically receives data from each RPA platform through respective adapters 220. In some implementations, each adapter 220 is specific to a respective RPA platform, and is installed on an RPA server of the RPA platform. For example, the adapters 220 of FIG. 2 correspond to the adapters 142_1, 142_n of FIG. 1. In some examples, the adapter 220 harmonizes data by transforming data of the respective RPA platform into a data schema used by the AP 200, and providing the data to the AP 200 (e.g., to the data pipeline 238). In some examples, each adapter 220 includes multiple modular libraries, and code packages. One or more libraries are specific to the respective RPA platform that the adapter 220 is installed on. One or more libraries are common to all of the adapters 220, regardless of which RPA platform.

In the depicted example, an adapter 220 includes a platform API 250, a platform data module 252, and a platform interface 254. In some examples, the platform interface 254 communicates with hardware 258 (e.g., servers, on which bots run), and/or a database 256 (e.g., storing log tables) of the respective RPA platform 260. For example, the platform interface 254 requests, and receives data from the database 256, which data is provided to the data pipeline 238 through the platform data module 252. In some implementations, the adapter controller 236 provides control signals for controlling a process, and/or bot through the platform API 250. For example, a process, and/or bot can be started, or stopped. In some examples, the adapter controller 236 can be used to configure, among other things, credentials for accessing the respective RPA platform 260, setting exception parameters (e.g., to trigger an exception), and the like.

In some implementations, the platform data module 252 relays data records (e.g., containing automation information) from the RPA platform 260 to the AP 200. Token and SSL authentication is in place to ensure the data is securely sent. In some examples, the platform data module 252 includes an automatic discovery that synchronizes new processes, and/or resources to ensure the AP 200 reflects the current state of the RAP platform 260. In some examples, automation synchronization transfers process run, resource run, and truncation status information. In some examples, the platform data module 252 publishes messages from a messaging queue to an AutomationData topic hosted on the data pipeline 238. In some implementations, the platform API 250 receives authenticated calls (e.g., REST calls) from the AP 200 to trigger resource action, and/or process action, and/or remote updates of configuration.

As introduced above, the data pipeline 238 can be provided as a Kafka cluster. In some examples, there are three main types of objects in the data pipeline 238: topics (queues of messages), producers (actors that add messages to a topic), and consumers (actors that take messages out of a topic). In the present context, the automation data processor 234 is a consumer, and the platform data module 252 is a producer. In some examples, the data pipeline 238 ensures that consumers of a topic receive its messages in the order they were added. In the present context, the platform data module 252 produces messages for the AutomationData topic. In some examples, the data in the messages includes, without limitation: newly discovered processes, and/or resources in the RPA platform 260; newly created instances of a process, and/or a resource are created; and transaction status, and log data for running processes, and/or running resources.

In some implementations, parameters can be defined to determine whether a respective process, bot, and/or RPA platform is operating as expected (e.g., meeting service level agreements (SLAs)), and/or whether there are any problems (e.g., process unexpectedly stopped, bot performance is degraded, hardware performance is degraded). In some examples, if operation is not executing as expected, and/or there is a problem, an exception is triggered. Example exceptions can include a process, a bot, and/or a RPA platform not meeting a required SLA (e.g., a business exception), and performance degradation of a process, a bot, and/or a RPA platform (e.g., a technical exception). In response to an exception, reports, and/or alerts can be provided.

In general, the AP 200 ingests data from one or more RPA platforms through the data pipeline 238, processes the data using the automation data processor 234, and stores the data in the database 230. In the depicted example, a back-up database 240 is provided, which can store redundant copies of the data, and any reports or the like that the AP 200 provides. In some examples, the messaging service 232 transmits notifications (e.g., alerts), for example, in response to conditions (e.g., an e-mail to a user responsible for monitoring the particular RPA platform). In some examples, the reports, and/or alerts are graphically represented using one or more visualizations (e.g., provided through the monitoring service 226). Example notifications can include, without limitation: process X has completed; resource X has completed; process X has a high application exception rate; process X has a high business exception rate; resource X has stopped responding; and resource X has not responded in X minutes.

In some implementations, the data is provided in various data types. Example data types include, without limitation, process run, resource run, transaction, log. In some examples, process data is representative of a particular process executed by a bot (e.g., a process that queues tasks to be performed). In some implementations, data is provided to the AP 200 in one or more data records. For example, a data record having a process type can include the example tuple, process identifier, process information (e.g., status, bot identifier), timestamp, process run type. In some examples, resource data is representative of a bot performing tasks. For example, a data record having a resource type can include the example tuple: resource identifier, resource information (e.g., status, process identifier), timestamp, resource run type. In some examples, resource data is representative of a bot performing tasks. In some examples, transaction data is representative of actions (e.g., a task changing from a pending status to a running status on a particular bot). For example, a data record having a transaction type can include the example tuple: transaction identifier, transaction status (e.g., pending, running, process identifier, bot identifier), timestamp, transaction type. In some examples, log data is representative of data added to one or more logs (e.g., an exceptions log). For example, a data record having a log type can include the example tuple: log identifier, log data (e.g., application/bot/process failed), timestamp, log type.

In some implementations, each data record is tagged. Example tags can include, without limitation, create, update, and delete. A create tag can indicate that a log entry is to be created, that a process has started, or that a resource has started. An update tag can indicate that data associated with a process or a resource has changed. A delete tag can indicate that a process or a resource has finished.

In accordance with implementations of the present disclosure data records from one or more RPA platforms are ingested into the UAP. A general data flow can be described as a bot executing processes on a VM, data records representative of process execution, the bot, and/or the VM are generated, and the data records are automatically ingested into the UAP, as described herein. As also described herein with reference to FIG. 1, the data records can be processed, and data (e.g., exception data) can be stored in the database 110 of the ROC 102. In some examples, the data can be fed into an analytics environment (e.g., the analytics module 116 of the ROC 102). The analytics environment can process the data (e.g., tag, concatenate, manipulate) to provide data points for visualizations. For example, a visualization dashboard can be provided, which enables users to view and resolve issues that are occurring within the RPA platforms. In some examples, the visualization dashboards are provided as interactive dashboards that users can manipulate views, apply filters, and the like to identify bots/processes with exceptions, excessive failure rates, identify patterns, and conduct resource allocation planning. Data records ingested into the UAP can include, without limitation, queue data, process files, event logs, and application logs.

As introduced above, implementations of the present disclosure are directed to optimization within RPA platforms. In accordance with implementations of the present disclosure, optimization can be achieved based on predictive analytics. Example predictive analytics include event sequencing analysis, and pre-event prediction.

Figure 3A:
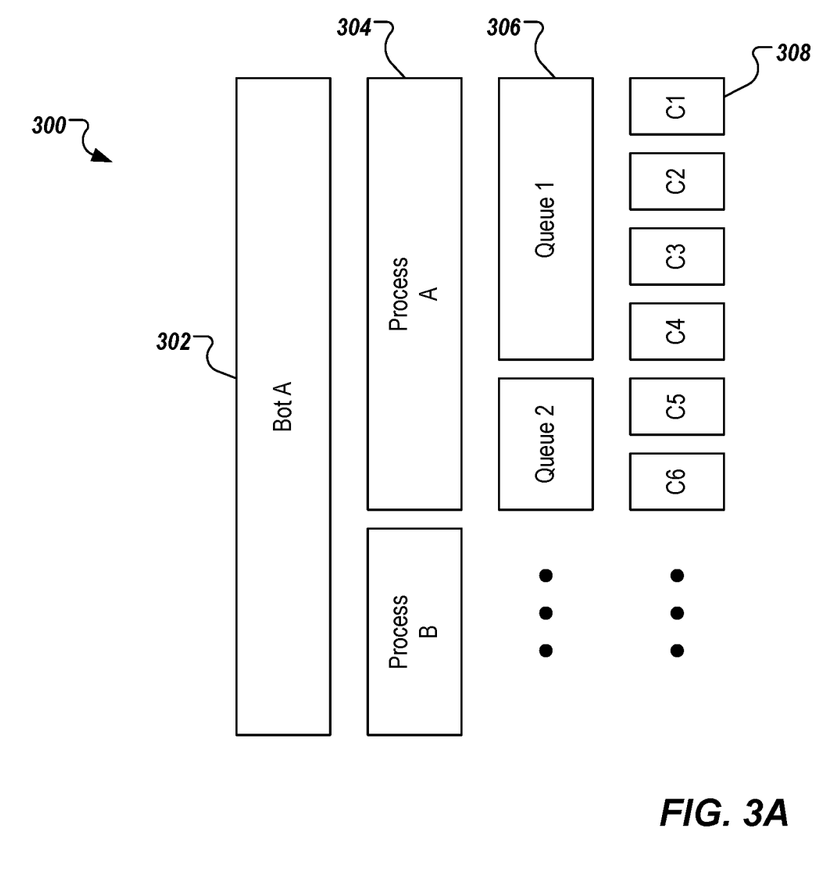
FIG. 3A conceptually depicts example process execution in RPA platforms.

With regard to event sequencing analysis, and as described in further detail herein, each process step in a process executed in a RPA platform is evaluated in real-time to determine whether there is deviation from an expected path in the sequence. With particular reference to FIG. 3A, and as introduced above, each RPA platform provides one or more bots 302 executed in VMs. In some examples, each bot 302 executes one or more processes 304. In some examples, each process 304 includes one or more queues 306, and each queue includes one or more components 308 that are to be executed. In some examples, a component 308 can be used in multiple, different processes 306. For each queue 306 with multiple components 308, a sequence of components is provided, and dictates an order, in which the components 308 are to be executed. Each component sequence can be referred to as a component run within a queue 306. That is, a component run reflects an order, in which the components 308 are to be executed, and not a specific time for execution.

In accordance with implementations of the present disclosure, an analytical record is provided for each component run. For example, each component run makes up a row within an analytical record. In some examples, and as described in further detail herein, each analytical record is provided from the event logs. In the example of FIG. 3A, an analytical record can be provided based on the component run having the order C1, C2, C3, C4 for Queue 1. Success or failure of a process 304 is based on the component run, which is evaluated against criteria, as described in further detail herein. Accordingly, diagnosis is at the component level, but the result (e.g., binary success/failure) is at the process level.

In some implementations, evaluation of a component run is based on multiple dimensions. Example dimensions include, without limitation, time-based variables, sequence-based variables, severity indices, patterns, and historical application exceptions.

In some implementations, time-based variables can be used to predict failure based on historical run times. Time-based variables can include, without limitation, component run times, and queue item run times. In some examples, component run times include time required for components to execute within queue items, and processes across one or more bots within a defined time-period (e.g., all bots within the RPA platform in the last 24 hours). In some examples, time-based variables can include statistics determined from the component run times. Example statistics can include, without limitations, average, minimum, maximum, $80^{th}$ percentile, and $20^{th}$ percentile of individual component run times within queue items, processes, and bots (e.g., in the last 24 hours). In some examples, a component run is evaluated against one or more time-based variables, and exceptions can be flagged. For example, if a component run time exceeds the average component run time, exceeds the maximum component run time, exceeds the $80^{th}$ percentile, or falls below the $20^{th}$ percentile, an exception for the component is flagged.

In some examples, queue run times include the time required for queues to be completed across one or more bots in a defined time-period. In some examples, time-based variables can include statistics determined from the queue run times. Example statistics can include, without limitations, average, minimum, maximum, $80^{th}$ percentile, and $20^{th}$ percentile of queue run time (e.g., in the last 24 hours). In some examples, a queue is evaluated against one or more time-based variables, and exceptions can be flagged. For example, if a queue run time exceeds the average queue run time, exceeds the maximum queue run time, exceeds the $80^{th}$ percentile, or falls below the $20^{th}$ percentile, an exception for the queue is flagged.

In some implementations, sequence-based variables are used to predict failure based on the sequence of components running within a queue. In some examples, sequence-based variables can include, without limitation, a previous component identifier (e.g., an identifier indicating an immediately previous executed component), a component sequence within each queue item within a process (e.g., C1, C2, C3, C4), a number of repetitive component sequences within each process, a mode of previous X components (e.g., previous 10 components, previous 20 components), a number of completed steps in the current process, a number of completed processes in the current bot that is running, an average number of components and distinct components in the current process. Mode refers to the statistical definition of mode (meaning the most commonly occurring number or in this case most commonly occurring component). For example, the mode of the previous 10 components would be the component that ran most frequently in the previous 10 component runs. Steps refers to a unique component sequence within a particular queue item. For example, the queue item which runs components C1, C2, C1, C3, C4, C1 in that particular order has 6 steps but only 4 distinct components.

In some examples, component execution is evaluated against one or more sequence-based variables. For example, if a component runs out of sequence, as defined by the component sequence within each queue, an exception can be flagged (e.g., C3 executes before C2). Flags are created when a component runs out of a sequence. These flags can be used as predictors in the ML model to understand how they correlate to application failures. It can be noted, however, that one or more flags might not always refer to application exceptions. This is because the same process in multiple instances can have different sequences of components, which can all be correct, as there is not a properly defined mapping.

In some implementations, severity indices can be determined from historical exceptions for the component level, and/or process level. Example severity indices can include, without limitation, a component severity index, and a process severity index.

In some examples, the component severity indices reflect currently executing components, and/or previously executed components, and can be calculated based on historical application failure rates (e.g., in last 24 hours). In some examples, statistics can be determined, and can include, without limitation, average, minimum, maximum, $80^{th}$ percentile, and/or $20^{th}$ percentile of severity of previous X components (e.g., 10 components) within the current process. In some examples, an exception can be flagged if a current severity exceeds the average, exceeds the maximum, falls below the minimum, falls below the $20^{th}$ percentile, or exceeds the $80^{th}$ percentile. In some examples, historical component severity refers to the application failure rates (proportion of application exceptions within all runs of a particular component). For example, if a component ran 100 distinct times within a process and failed 25 times historically, it's severity then would be 0.25)

In some examples, the process severity indices reflect currently executing processes, and/or previously executed processes, and can be calculated based on historical application failure rates (e.g., in last 24 hours). In some examples, statistics can be determined, and can include, without limitation, average, minimum, maximum, $80^{th}$ percentile, and/or $20^{th}$ percentile of severity of previous X processes (e.g., all process runs within the last 24 hours). In some examples, an exception can be flagged if a current severity exceeds the average, exceeds the maximum, falls below the minimum, falls below the $20^{th}$ percentile, or exceeds the $80^{th}$ percentile.

In some implementations, one or more patterns can be provided based on text mining of log messages, and/or program notes related to bot runs. In some examples, for historical failures, latent semantic analysis can be executed to extract patterns in log messages, and one or more patterns can be representative of an application failure. In further detail, tens, or hundreds of concepts can be extracted from textual records (e.g., log files, and/or program notes) based on patterns of text. In some examples, each pattern reflects a frequency of occurrence of words within runs (e.g., component runs, process runs). Using term frequency, inverse document frequency matrix, and/or singular value decomposition, one or more patterns can be associated with a process failure. In this manner, text (e.g., from log files) of currently executing processes can be compared to the one or more patterns to predict failure. For example, the word pattern X, Y, Z with respective frequencies is representative of a failure. If, for a currently executing process, a similar word pattern is developing, failure of the currently executing process can be predicted.

In some implementations, historical application exceptions can be used to predict failure. For example, historical application exceptions can relate failures of particular components to process failures. In some examples, historical application exceptions can be based on a time since last exception, and time since last application exception in the current queue item current process, and/or across different processes in a defined time period (e.g., the last 24 hours). In some examples, historical application exceptions can be based on a total count of exceptions, and respective types in the current queue, current process, and/or across different processes in a defined time period (e.g., the last 24 hours). Considering time since last application exception as a non-limiting example, there can be hidden patterns or correlations of this time-based variable with the actual application failures. In some examples, the ML model uncovers hidden correlations, and uses this in tandem with among other variables and flags to predict the next application exception.

As introduced above, an analytical record can be developed for a component run, and can be processed in view of a predictive model to predict failure. In some implementations, the predictive model is provided based on historical data (e.g., event logs) representative of the dimensions described above. In some examples, the predictive model is trained using a machine learning (ML) process. The predictive model can be trained based on historical analytical records for the RPA platform (e.g., component run times, component sequences, severity, historical failures, patterns in log messages).

In some implementations, a subs-set of the analytical record is used to train the predictive model. For example, a sub-set of processes executed by the RPA platform can be selected, and portions of the analytical record attributed to the processes in the sub-set of processes are used to train the predictive model. In some examples, one or more criteria are provided to determine which processes are included in the sub-set of processes. Example criteria can include, without limitation, processes that have worked on a threshold number of queues (e.g., at least 25 queues), processes that execute for a threshold time period (e.g., at least one hour), and processes that have a threshold application failure rate (e.g., greater than 10%). In some examples, processes that meet one or more, or all of the criteria are included in the sub-set of processes.

In some implementations, data in the application record associated with the sub-set of processes is processed through ML to provide the predictive model. An example ML algorithm include Xtreme Gradient boost (XGBoost), which provides the predictive model as a tree-based model. It is contemplated, however, that any appropriate ML technique, and model type can be used for the predictive model.

In some implementations, the predictive model receives analytical record data of an executing process, and provides a prediction with respect to failure during the process run. In some examples, each prediction is provided at the component level, which is then rolled up to the process level. An example prediction includes a probability (e.g., percent chance/likelihood) that a failure at the component level will occur. In some examples, each prediction is converted to a binary score (e.g., 0 flag indicating unlikely to fail, 1 flag indicating likely to fail). For example, if a prediction exceeds a threshold score (e.g., 70%), the flag is set to likely to fail (e.g., 1), otherwise the flag is set to unlikely to fail (e.g., 0). In some examples, at the process level, if a threshold number of predictions (e.g., 50%) at a component level are predicted as failures by the predictive model, then the process is flagged as likely to fail. For example, if a process includes five components, three of which has a prediction of likely to fail (e.g., 1), the process is flagged as likely to fail. As another example, if a process includes five components, two of which have a prediction of likely to fail (e.g., 1), the process is not flagged as likely to fail.

In some implementations, and as introduced above, predictions are made at a process level to predict application exceptions (e.g., which of the processes that are currently running are likely to fail?). In some examples, a process is said to fail when more than X % (e.g., 10%) of queues have failed (e.g., based on the component level predictions described above). In some implementations, an initial prediction is made after a predetermined number of queues have completed running (e.g., 5% of queues have run). In some implementations, predictions are refreshed after each successive queue completes running.

Figure 3B:
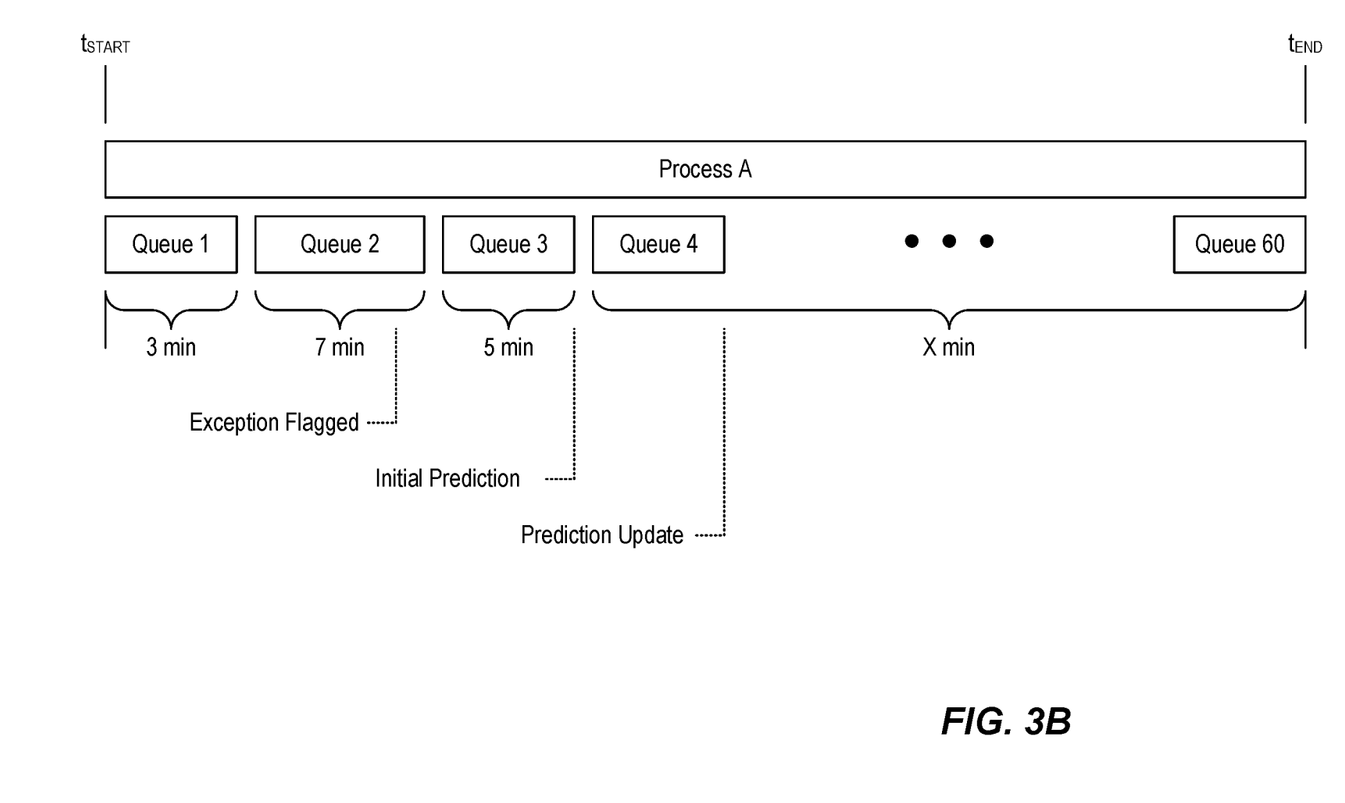
FIG. 3B conceptually depicts an example process run.

An example of this is described with reference to FIG. 3B, which conceptually depicts an example process run 320. In this example, the example process run 320 works on 60 queues, and is expected to take approximately 5 hours to complete. For example, the example process run 320 begins at a start time ($t_{START}$) (e.g., 13:00), and is expected to complete at an end time ($t_{END}$) (e.g., 18:00). In this example, an initial prediction ($P_{INIT}$) is provided after the third queue completes its run (e.g., after 5% of the queues have completed). That is, after Queue 3 completes its run, the analytical record (e.g., recording exceptions that have occurred) for the process run 320 is processed to predict whether the process run 320 will fail. In the depicted example, an exception is flagged for Queue 2 (e.g., components executed out of sequence). Assuming that the exception for Queue 2 is the only exception at the end of Queue 3, the initial prediction may indicate that there is a sufficiently low likelihood of failure, and the process run 320 continues. After each subsequent queue completes, an updated prediction ($P_{UPD}$) is provided based on all of the data available to that point. In the depicted example, the updated prediction is provided at the end of Queue 4. Since the exception for Queue 2 is the only exception at the end of Queue 4, the updated prediction may indicate that there still is a sufficiently low likelihood of failure, and the process run 320 continues.

In accordance with implementations of the present disclosure, a likelihood of process failure can be predicted in real-time, and an alert can be provided ahead of the predicted failure to facilitate resolution in an effort to avoid the failure. In some implementations, if the process is predicted as likely to fail (e.g., flag set equal to 1), an alert is provided to one or more users. In some examples, the alert is provided through one or more channels. For example, the alert can be sent by text message, email message, and/or displayed within a dashboard. In this manner, sufficient time may be provided for action to avoid the failure. For example, by predicting failure, a RPA team could proactively investigate bots that are running the processes likely to fail, and intervene and/or monitor the process as it runs in real-time, and readjust the bots parameters in real-time to prevent failure. Although the ML model predicts a failure accurately it doesn't point out the root cause of the failure. Consequently, the RPA team can detect the cause of the issue. If the issue relates to platform failure at application source (as determined by the RPA team), the RPA team could proactively reach out to Client IT team/technology owner to address the issue in the source platform. The RPA team could also re-schedule the robots to run processes that are less likely to fail, while investigating the primary issue behind the failure.

Figure 4:
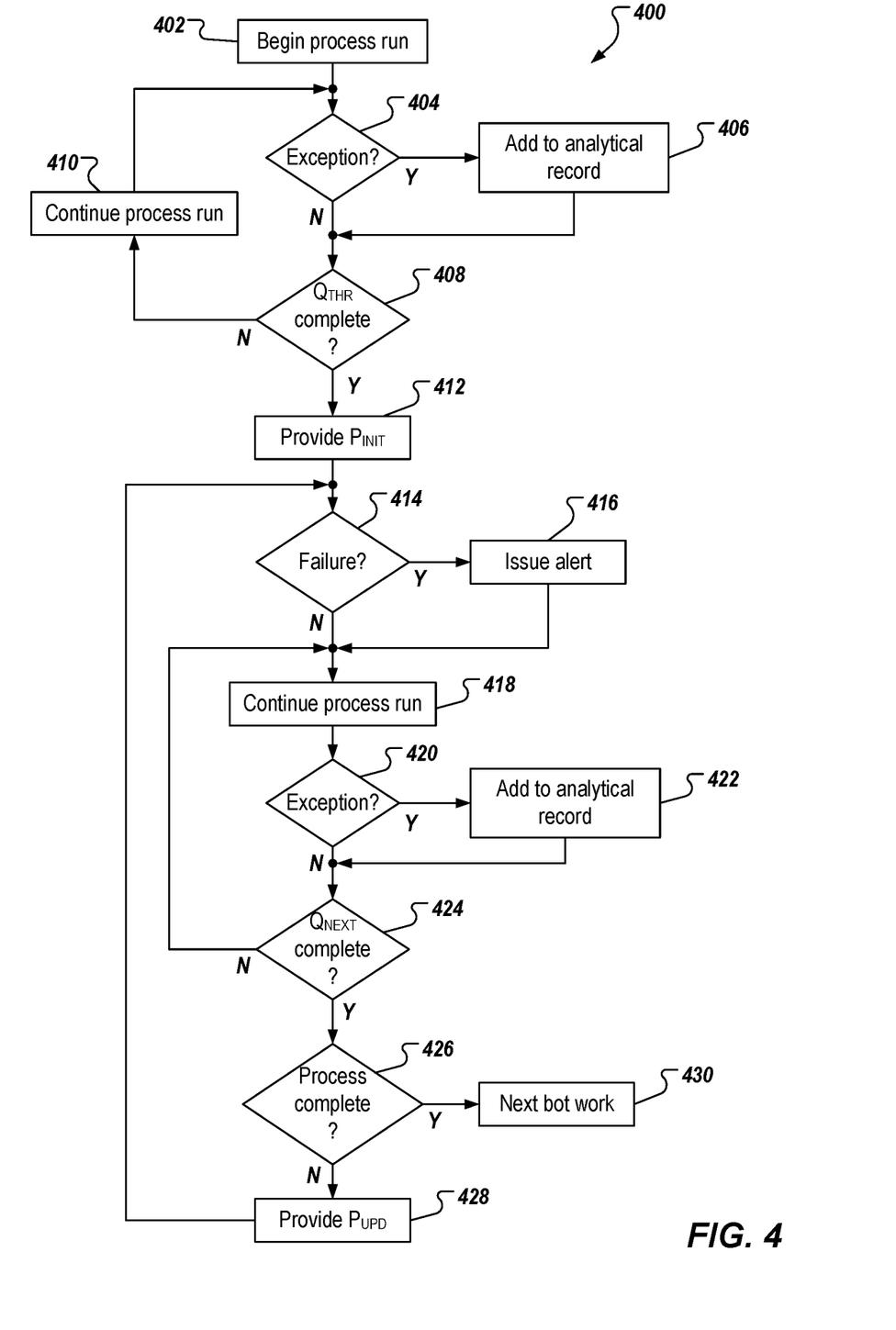
FIG. 4 depicts an example process in accordance with implementations of the present disclosure.

FIG. 4 depicts an example process 400 that can be executed in implementations of the present disclosure. In some examples, the example process 400 is provided using one or more computer-executable programs executed by one or more computing devices.

A process run begins (402). For example, a bot of an RPA platform begins execution of a process. It is determined whether an exception has occurred (404). For example, the RPA platform can report exceptions including, without limitation, a process, a bot, and/or a RPA platform not meeting a required SLA (e.g., a business exception), and performance degradation of a process, a bot, and/or a RPA platform (e.g., a technical exception). If an exception has occurred, the exception is added to an analytical record of the process run (406).

It is determined whether a threshold number of queues ($Q_{THR}$) has been completed (408). For example, and as described herein, prediction of potential failure can be performed after $Q_{THR}$ have been completed. If the $Q_{THR}$ have not been completed, the example process 400 loops back. If the $Q_{THR}$ have been completed, an initial prediction ($P_{INIT}$) is provided (412). It is determined whether failure of the process is predicted (414). If failure of the process is not predicted, the process run continues (418). If failure of the process is predicted, an alert is issued (416), and the process run continues (418). It is determined whether an exception has occurred (420). If an exception has occurred, the exception is added to an analytical record of the process run (422). It is determined whether a next queue ($Q_{NEXT}$) has been completed (424). If the $Q_{NEXT}$ has not been completed, the example process 400 loops back. If the $Q_{NEXT}$ has been completed, it is determined whether the process run has completed (426). If the process run has not completed, an updated prediction ($P_{UPD}$) is provided (428), and the example process 400 loops back to determine whether failure of the process is predicted (414). If the process run has completed, a next bot is set to work (430).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for identifying potential process failure in a robotic process automation (RPA) platform, the method comprising:
   providing a unified automation platform (UAP) for management, control, and analytics across multiple, disparate RPA platforms including the RPA platform, each RPA platform being associated with an enterprise of a plurality of enterprises;
   providing a predictive model based on application records of processes executed in the RPA platform;
   receiving, by the UAP, data representative of a process being executed by a bot within the RPA platform, the bot comprising one of a plurality of bots, each bot being software-implemented and deployed using a respective virtual machine (VM), the data being provided in real-time as a portion of the process is executed by the bot, the bot interacting with an application to execute the portion of the process;
   determining, by the UAP, a set of predictions by processing the data representative of a process using the predictive model; and
   determining, by the UAP, a process-level prediction based on values of predictions in the set of predictions, the process-level prediction indicating a likelihood of failure of the process, the process-level prediction being provided during execution of the process and comprising one of:
      an initial prediction determined in response to completion of a threshold number of queues of the process, and
      an updated prediction determined in response to completion of a queue of the process after the threshold number of queues have been completed; and
   selectively issuing an alert in response to the process-level prediction.

2. The method of claim 1, wherein determining a process-level prediction comprises:
   determining predictions of respective components of a queue of the process based on the predictive model, the predictions being included in the set of predictions; and
   providing the process-level based on a number of failure predictions of the respective components in the set of predictions.

3. The method of claim 1, wherein the process-level prediction comprises a value indicating one of success and failure of the process.

4. The method of claim 1, wherein the application records each comprise data representative of one or more dimensions comprising time-based variables, sequence-based variables, severity indices, patterns, and historical application exceptions.

5. The method of claim 1, wherein the processes comprise a sub-set of processes executed on the RPA platform, each process in the sub-set of processes meeting criteria for inclusion in the sub-set of processes.

6. The method of claim 5, wherein the criteria comprises executed queues exceeding a threshold number of executed queues, execution time exceeding a threshold time period, and failure rate exceeding a threshold application failure rate.

7. One or more non-transitory computer-readable storage media coupled to one or more processors and having instructions stored thereon which, when executed by the one or more processors, cause the one or more processors to perform operations for identifying potential process failure in a robotic process automation (RPA) platform, the operations comprising:
   providing a unified automation platform (UAP) for management, control, and analytics across multiple, disparate RPA platforms including the RPA platform, each RPA platform being associated with an enterprise of a plurality of enterprises;
   providing a predictive model based on application records of processes executed in the RPA platform;
   receiving, by the UAP, data representative of a process being executed by a bot within the RPA platform, the bot comprising one of a plurality of bots, each bot being software-implemented and deployed using a respective virtual machine (VM), the data being provided in real-time as a portion of the process is executed by the bot, the bot interacting with an application to execute the portion of the process;
   determining, by the UAP, a set of predictions by processing the data representative of a process using the predictive model; and
   determining, by the UAP, a process-level prediction based on values of predictions in the set of predictions, the process-level prediction indicating a likelihood of failure of the process, the process-level prediction being provided during execution of the process and comprising one of:
      an initial prediction determined in response to completion of a threshold number of queues of the process, and
      an updated prediction determined in response to completion of a queue of the process after the threshold number of queues have been completed; and
   selectively issuing an alert in response to the process-level prediction.

8. The computer-readable storage media of claim 7, wherein determining a prediction comprises:
   determining predictions of respective components of a queue of the process based on the predictive model, the predictions being included in the set of predictions; and
   providing the process-level based on a number of failure predictions of the respective components in the set of predictions.

9. The computer-readable storage media of claim 7, wherein the process-level prediction comprises a value indicating one of success and failure of the process.

10. The computer-readable storage media of claim 7, wherein the application records each comprise data representative of one or more dimensions comprising time-based variables, sequence-based variables, severity indices, patterns, and historical application exceptions.

11. The computer-readable storage media of claim 7, wherein the processes comprise a sub-set of processes executed on the RPA platform, each process in the sub-set of processes meeting criteria for inclusion in the sub-set of processes.

12. The computer-readable storage media of claim 11, wherein the criteria comprises executed queues exceeding a threshold number of executed queues, execution time exceeding a threshold time period, and failure rate exceeding a threshold application failure rate.

13. A system, comprising:
   one or more processors; and
   a computer-readable storage device coupled to the one or more processors and having instructions stored thereon which, when executed by the one or more processors, cause the one or more processors to perform operations for identifying potential process failure in a robotic process automation (RPA) platform, the operations comprising:

provi­ding a unified automation platform (UAP) for management, control, and analytics across multiple, disparate RPA platforms including the RPA platform, each RPA platform being associated with an enterprise of a plurality of enterprises;

providing a predictive model based on application records of processes executed in the RPA platform;

receiving, by the UAP, data representative of a process being executed by a bot within the RPA platform, the bot comprising one of a plurality of bots, each bot being software-implemented and deployed using a respective virtual machine (VM), the data being provided in real-time as a portion of the process is executed by the bot, the bot interacting with an application to execute the portion of the process;

determining, by the UAP, a set of predictions by processing the data representative of a process using the predictive model; and determining, by the UAP, a process-level prediction based on values of predictions in the set of predictions, the process-level prediction indicating a likelihood of failure of the process, the process-level prediction being provided during execution of the process and comprising one of:

an initial prediction determined in response to completion of a threshold number of queues of the process, and an updated prediction determined in response to completion of a queue of the process after the threshold number of queues have been completed; and selectively issuing an alert in response to the process-level prediction.

14. The system of claim 13, wherein determining a prediction comprises:

determining predictions of respective components of a queue of the process based on the predictive model, the predictions being included in the set of predictions; and providing the process-level based on a number of failure predictions of the respective components in the set of predictions.

15. The system of claim 13, wherein the process-level prediction comprises a value indicating one of success and failure of the process.

16. The system of claim 13, wherein the application records each comprise data representative of one or more dimensions comprising time-based variables, sequence-based variables, severity indices, patterns, and historical application exceptions.

17. The system of claim 13, wherein the processes comprise a sub-set of processes executed on the RPA platform, each process in the sub-set of processes meeting criteria for inclusion in the sub-set of processes.

18. The system of claim 17, wherein the criteria comprises executed queues exceeding a threshold number of executed queues, execution time exceeding a threshold time period, and failure rate exceeding a threshold application failure rate.

* * * * *